(12) United States Patent
Allyn

(10) Patent No.: US 8,109,033 B1
(45) Date of Patent: Feb. 7, 2012

(54) AUTOMATIC PRECISION BAITING DEVICE

(76) Inventor: M. David Allyn, Camden, ME (US)

(*) Notice: Subject to any disclaimer, the term of this patent is extended or adjusted under 35 U.S.C. 154(b) by 0 days.

(21) Appl. No.: 13/151,859

(22) Filed: Jun. 2, 2011

(51) Int. Cl.
*A01K 91/18* (2006.01)

(52) U.S. Cl. ............................................. 43/4; 43/27.4

(58) Field of Classification Search ............... 43/4, 4.5, 43/27.4
See application file for complete search history.

(56) References Cited

U.S. PATENT DOCUMENTS

| | | | |
|---|---|---|---|
| 2,518,590 A * | 8/1950 | Andrist | 43/4 |
| 3,377,733 A | 4/1968 | Godo | |
| RE28,380 E | 4/1975 | Tison | |
| 4,015,359 A | 4/1977 | Andrews | |
| 4,250,648 A * | 2/1981 | Jacobsen | 43/4 |
| 4,354,323 A * | 10/1982 | Huff | 43/4 |
| 4,437,254 A * | 3/1984 | Fancey et al. | 43/4 |
| 4,461,112 A * | 7/1984 | Jacobsen | 43/4 |
| 4,477,992 A | 10/1984 | Lang | |
| 4,644,677 A * | 2/1987 | Chureau | 43/4 |
| 4,704,815 A | 11/1987 | Poirier | |
| 4,751,787 A * | 6/1988 | Jonsson | 43/4 |
| 4,896,449 A * | 1/1990 | Hopper | 43/4 |
| 4,908,972 A * | 3/1990 | Stamer et al. | 43/4 |
| 5,165,194 A * | 11/1992 | Jonsson | 43/27.4 |
| 5,257,473 A * | 11/1993 | Reynolds et al. | 43/4 |
| 5,291,681 A * | 3/1994 | Bjornson et al. | 43/8 |
| 5,862,620 A * | 1/1999 | Bjørshol | 43/4 |

* cited by examiner

*Primary Examiner* — Kimberly Berona
(74) *Attorney, Agent, or Firm* — Anthony Pellegrini, Esq.

(57) ABSTRACT

An improved automatic precision baiting apparatus for use with long line fishing gear, the apparatus having a baiter housing, a magazine, a hook rail extension, a hook orientation means, a baiting area, a bait moving means for moving bait to the baiting area, and a bait cutting means; where an unbaited fish hook is drawn off the magazine, over the hook rail extension, and into the hook orienting means of the apparatus where it is positioned in anticipation of being baited; and where an uncut piece of bait is fed into the baiting area of the apparatus by the bait moving means and cut by the bait cutting means to the appropriate size, then held in the baiting area of the apparatus until engaged by a hook.

26 Claims, 11 Drawing Sheets

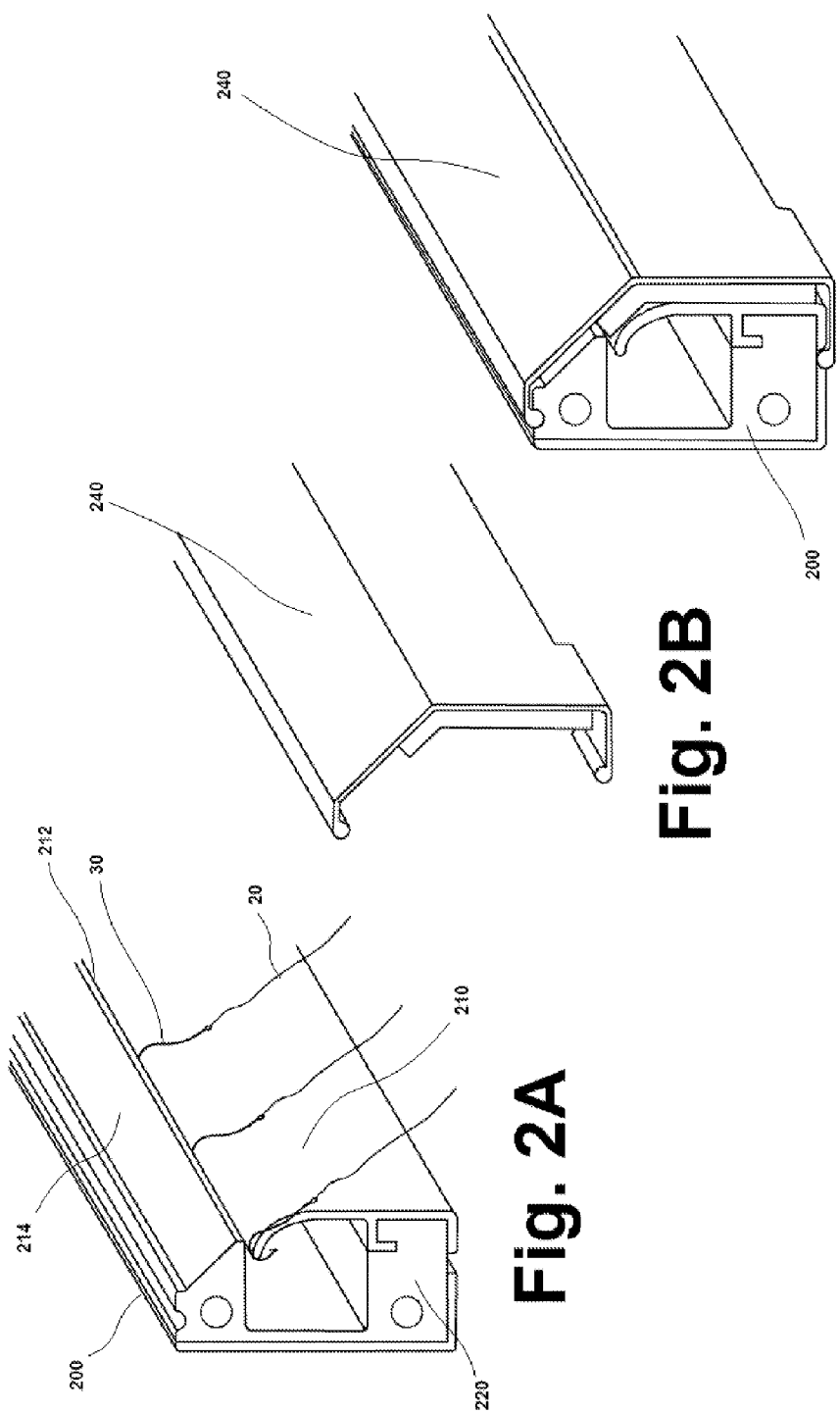

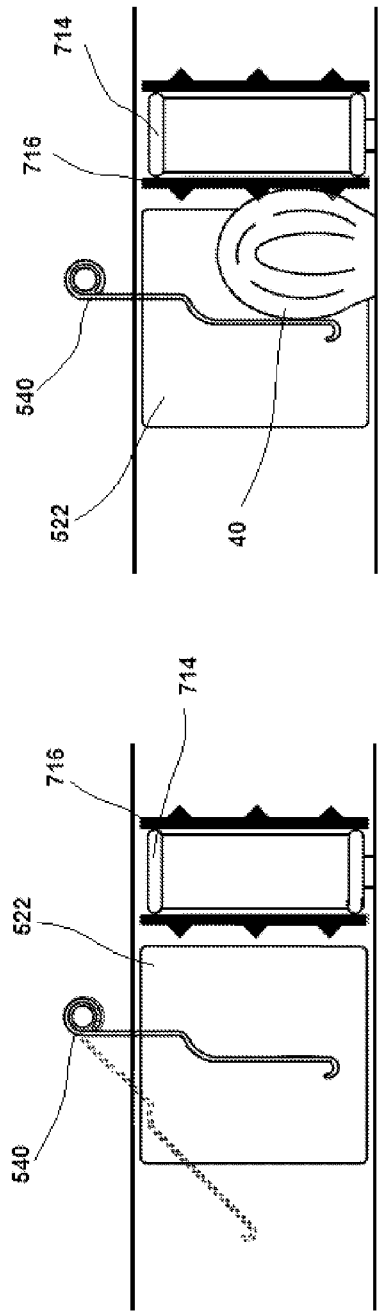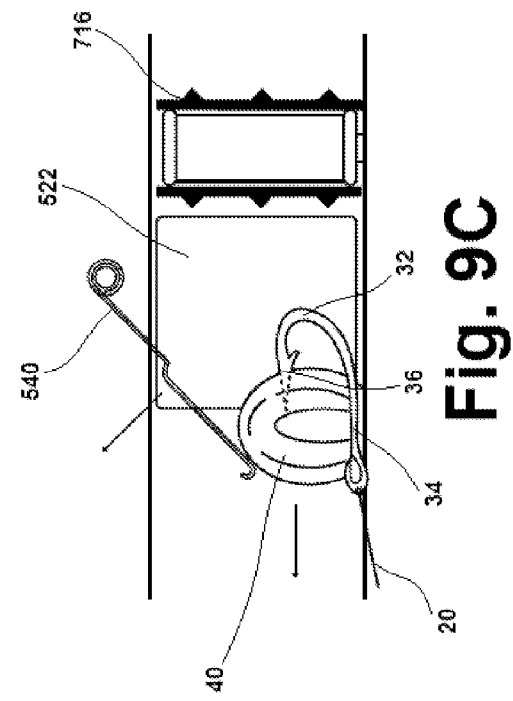

AUTOMATIC PRECISION BAITING DEVICE

BACKGROUND OF THE INVENTION

1. Technical Field

The present invention relates generally to the field of automatic baiting devices for long line commercial fishing gear. More particularly, the present invention is directed to precision baiters which prepare bait for baiting hooks and attach said prepared bait onto said hooks.

2. Description of Prior Art

Long line fishing gear is a type of fishing gear used by commercial fishermen to catch bottom feeding fish. Long line gear includes a ground line, two or more buoy lines attached at least at the ends of the ground line, buoys attached to the ends of the buoy lines, two or more anchors attached at least at the ends of the ground line, and a plurality of leaders attached to the ground line, with each leader comprised of a gangion, which attaches at one end to the ground line, and a barbed hook, which is attached to the other end of the gangion. The ground line itself is typically a nylon rope having a length of anywhere from several hundred yards to several miles. The gangions are typically made of monofilament nylon having a tensile strength somewhat less than the tensile strength of the ground line, so that if a hook snags or is taken by an overlarge fish the gangion will break before the ground line. The number and spacing of the gangions on the ground line depends on the type of fish being sought, as does the length of the gangions. For example, when fishing for hake, the gangions are typically spaced four feet apart and are each 20 inches long. When fishing for cod, on the other hand, the gangions are typically spaced six feet apart and are each 30 inches long; and when fishing for halibut the gangions are typically spaced twelve feet apart and are each five feet long. The gangions may be permanently attached to the ground line (such is known as "fixed gear") or they may be removable from the ground line (such is known as "snap-on gear").

To fish using long line gear, the following procedure is typically followed. First, the buoy line with buoy is let out and deployed from a fishing boat. Then an anchor is set, fixing one end of the ground line to the ocean floor. The remaining length of ground line is then set by the fishing boat moving away from the first anchor. The second anchor is then set, fixing the second end of the ground line to the ocean floor. The second buoy line and buoy are then deployed. If the ground line is particularly long, additional anchors, marked with buoys attached to buoy lines, may be deployed along its length. After an appropriate period of time, the fishing boat returns to an end of the ground line, retrieves the buoy line and takes up the ground line. Any fish that are caught on the hooks are removed as the ground line is hauled onto the fishing boat.

Before the ground line is deployed, the hooks at the end of each of the gangions need to be baited. Historically, this was done by hand, which was a slow, tedious, and dangerous operation. Over the past several decades mechanized or automatic baiting has been developed, allowing the more rapid and safer baiting of hooks. These devices typically apply the bait to the hooks as the ground line is being deployed by the fishing boat. That is, the ground line is passed through a mechanized baiting apparatus as it is deployed into the ocean, with the bait attaching to the hooks as the hooks pass through the device.

The most common type of mechanized baiting device is a snag baiter. A snag baiter places a quantity of bait (cut or uncut) into a container and then draws the hooks through the container and the mass of bait. The hooks pierce pieces of bait as they pass by ("snagging" the bait). While snag baiters employ a fairly simple design, they have the serious deficiency of not ensuring that any given piece of bait is securely affixed to the hook. Because the impact of the hook with the bait is haphazard, the hook may not fully penetrate the piece of bait, or it may pierce a weakened portion of the bait, resulting in the bait falling off the hook. Or the hook may not pierce any bait at all, merely pushing through the mass of bait without affixing any single piece. As such, snag baiters may leave many hooks unbaited, or worse, poorly baited, whereby the bait comes off the hook after the ground line is deployed, resulting in an unbaited hook and the loss of the bait.

Another type of mechanized baiting device is a precision baiter. A precision baiter places individual piece of bait in the direct path of the moving hooks. The path of the hooks is precisely defined, and the position of the bait is exact. This ensures that the hook will engage the bait in the proper location, and that all hooks will receive bait. However, precision baiters known in the art also have suffered from deficiencies, primarily as to how to properly deliver appropriately sized bait to the proper location for baiting. Most rely on precutting the bait, which is time consuming.

In addition, all known mechanized baiting devices can act on only a single length of ground line at a time. This greatly limits the overall length of the ground line to whatever can be stored on deck and fed into the device. If multiple lengths of shorter ground line are used, the baiting device must be turned off in order to attach the new length of ground line to the ground line that has already been baited and deployed. This is not only inefficient but also impractical to accomplish, as the movement of the fishing boat also must be altered to prevent further deployment of the ground line during the attachment process. It is therefore very difficult to use multiple lengths of ground line with known mechanical baiting devices.

It is therefore demonstrated that there is a need for a mechanical baiting device that has a high degree of baiting efficiency while also allowing for a minimum of preparation of the bait.

It is thus an object of the present invention to provide an improved automatic precision baiting apparatus.

It is a further object of the present invention to provide an improved automatic precision baiting apparatus that ensures each hook is properly set into an appropriately prepared piece of bait.

It is yet a further object of the present invention to provide an improved automatic precision baiting apparatus that does not require precut bait but rather cuts the bait to desired sizes automatically.

It is yet a further object of the present invention to provide an improved automatic precision baiting apparatus that adapts to different forms of bait, such as fresh and frozen, when cutting the bait.

It is yet a further object of the present invention to provide an improved automatic precision baiting apparatus that allows for multiple lengths of ground lines to be stored and available for use without taking up an excessive amount of fishing boat deck space.

It is yet a further object of the present invention to provide an improved automatic precision baiting apparatus that allows for multiple lengths of ground line to be baited without interrupting the baiting process.

It is yet a further object of the present invention to provide an improved automatic precision baiting apparatus that comprises a double sided baiting path, for greater efficiency.

It is yet a further object of the present invention to provide an improved automatic precision baiting apparatus that allows for multiple magazines to organize and store gangions without tangling.

It is yet a further object of the present invention to provide an improved automatic precision baiting apparatus that allows for differently spaced gangions to be used on a ground line.

It is yet a further object of the present invention to provide an improved automatic precision baiting apparatus that allows for different length gangions to be used on a ground line.

Other objects of the present invention will be readily apparent from the description that follows.

SUMMARY OF THE INVENTION

The present invention discloses an improved automatic precision baiting apparatus for use with long line fishing gear. An unbaited fish hook is drawn through the apparatus where it comes in contact with a piece of bait and is impaled thereon, then the baited hook is drawn out of the apparatus and another unbaited hook repeats the cycle. Bait is fed into the apparatus and cut by the apparatus to the appropriate size, then held in the apparatus until engaged by each hook.

The apparatus comprises a baiter housing, a hook orienting means, a baiting area, a cutting blade, and a bait feeder. Also included in the device is a removable magazine attached to one end of the baiter housing. Operation of the apparatus includes moving unbaited hooks through the apparatus as the ground line is being deployed into the ocean. The magazine holds a plurality of hooks. A tub placed below the magazine contains the coiled ground line. Movement of an unbaited hook begins along the top edge of, and then off, the magazine and into the baiter housing, where the hook is received by the hook orienting means located on the baiter housing, where the hook is properly positioned. Simultaneously, uncut bait is moved by the bait feeder from a bait bin located on the baiter housing into the baiting area. The cutting blade cuts the bait to the desired size, and the cut bait is held in the baiting area as the properly positioned hook is moved along the hook orienting means into the baiting area and engages the bait. Once the bait is engaged by the hook the baited hook is moved out of the baiting area and out of the apparatus.

The magazine is designed to be removably attached to the baiter housing, so that multiple magazines may be swapped in and out of operation as multiple lengths of ground line are played out. In preferred embodiments the baiter housing further comprises a hook rail extending rearward, forming a connection between the magazine and the hook orienting means. The hook orienting means is a hook orienting slot formed into the baiter housing, adapted to receive a hook from the magazine and to orient it for proper engagement with the bait. The cut bait is held in the baiting area by a spring tensioned retention bar. The retention bar is biased in a down position by its spring; a piece of cut bait is pressed against the retention bar when the hook engages with the bait. The tension on the biasing spring is such that the force required to move the retention bar is greater than the force needed to allow the hook to properly engage the bait. This allows the bait to be properly and securely set onto the hook. Once the hook is set, however, the force on the retention bar continues to increase until the force on the retention bar overcomes the retention bar spring and moves the retention bar to an up position, allowing the hook with the cut bait engaged thereon to move out of the baiting area.

The operations of the cutting blade and the bait feeder are coordinated by synchronized switches. The bait feeder means moves uncut bait to the baiting area by a vertically oriented belt. When the bait reaches the baiting area it presses against a pressure plate located on the far wall, activating a switch which activates the cutting means and deactivates the bait feeder. The cutting means moves the cutting blade laterally, cutting the bait. The blade remains extended, separating the cut bait (in the baiting area) from the uncut bait (still in the bait feeder). At the same time that the cutting blade is extended, a retention bar moves into the down position in front of the cut bait. Thus, the cut piece of bait is secured on three sides: laterally by the pressure plate on the far side and by the extended blade on the near side (blocking the opening to the bait feeder), and in front by the retention bar. The fourth (back) side of the baiting area is open to allow the hook to travel towards the bait. Once the bait is engaged by the hook, the force of the hook being drawn by the ground line forces the retention bar up and the baited hook leaves the baiting area and leaves the apparatus. Once the bait leaves the baiting area there is no longer any pressure on the pressure plate, deactivating the switch and causing the cutting means to retract the blade, lift the retention bar, and reactivate the bait feeder, repeating the cycle for the next hook.

In the most preferred embodiments the apparatus is double sided, meaning that all of the elements described above are located on both the left side and right side of the baiter housing. That is, the baiter housing receives two magazines, has two parallel hook orienting slots located side by side, has two baiting areas supplied by two bait feeders and two bait bins. The double sided configuration allows a second magazine to be set up while a first magazine is being used. The leading end of the ground line in the second magazine can be secured to the trailing end of the ground line in the first magazine while the first ground line is being deployed and its associated hooks are being baited on the first side of the apparatus. This allows the second ground line to be deployed and its associated hooks baited on the second side of the apparatus without having to pause the deployment or baiting operations. Similarly, when the second magazine is being used, a third magazine may be set up on the first side, and so on, so that there is no limit to the number of lengths of ground line that can be deployed without having to stop the baiting process. This further allows for shorter lengths of ground line to be used, facilitating storage, manipulation of ground line, and fishing boat deck utilization.

Other features and advantages of the present invention are described below.

DESCRIPTION OF THE DRAWINGS

FIG. 2A depicts a partial perspective view of the magazine.

FIG. 2B depicts a partial perspective view of the magazine cover.

FIG. 2C depicts a partial perspective view of the magazine of FIG. 2A with the cover of FIG. 2B attached thereto.

FIG. 9A is a plan side view of the baiting area depicting the movement of the retention bar.

FIG. 9B is a plan side view of the baiting area depicting a piece of bait in the baiting area held in place by the retention bar in the down position.

FIG. 9C is a plan side view of the baiting area depicting a baited hook being drawn out of the baiting area and moving the retention bar to the up position as it passed thereunder.

DETAILED DESCRIPTION OF THE INVENTION

Figure 1A:
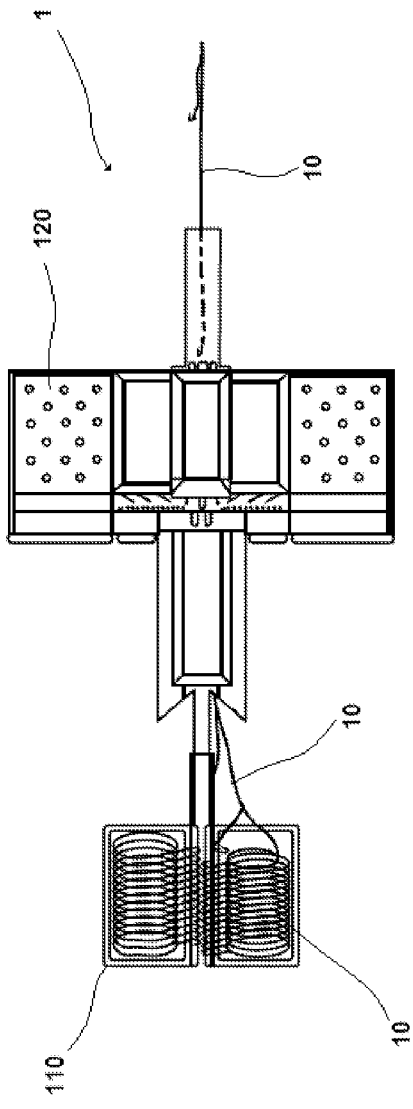
FIG. 1A depicts a top plan view of the apparatus.
Figure 1B:
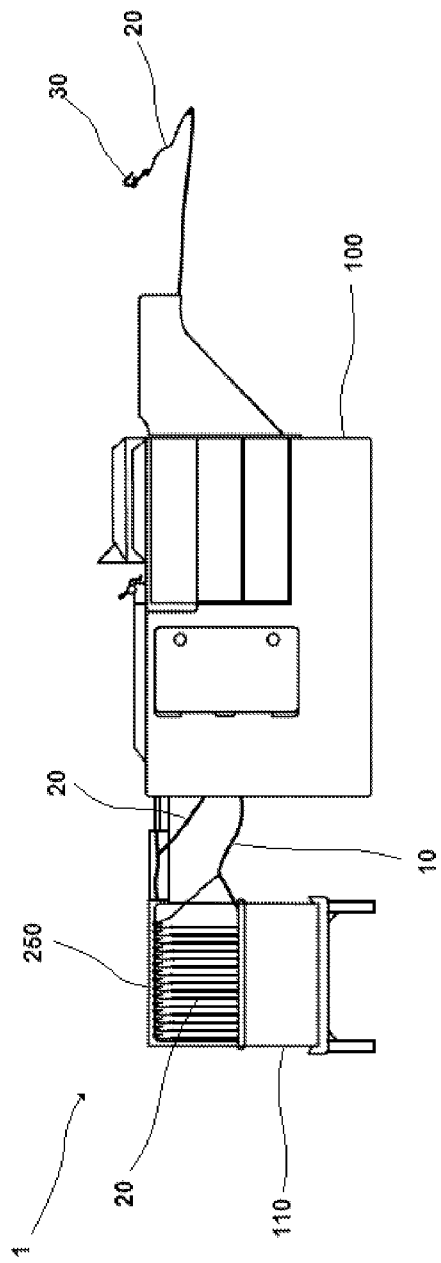
FIG. 1B depicts a side plan view of the apparatus.
Figure 11:
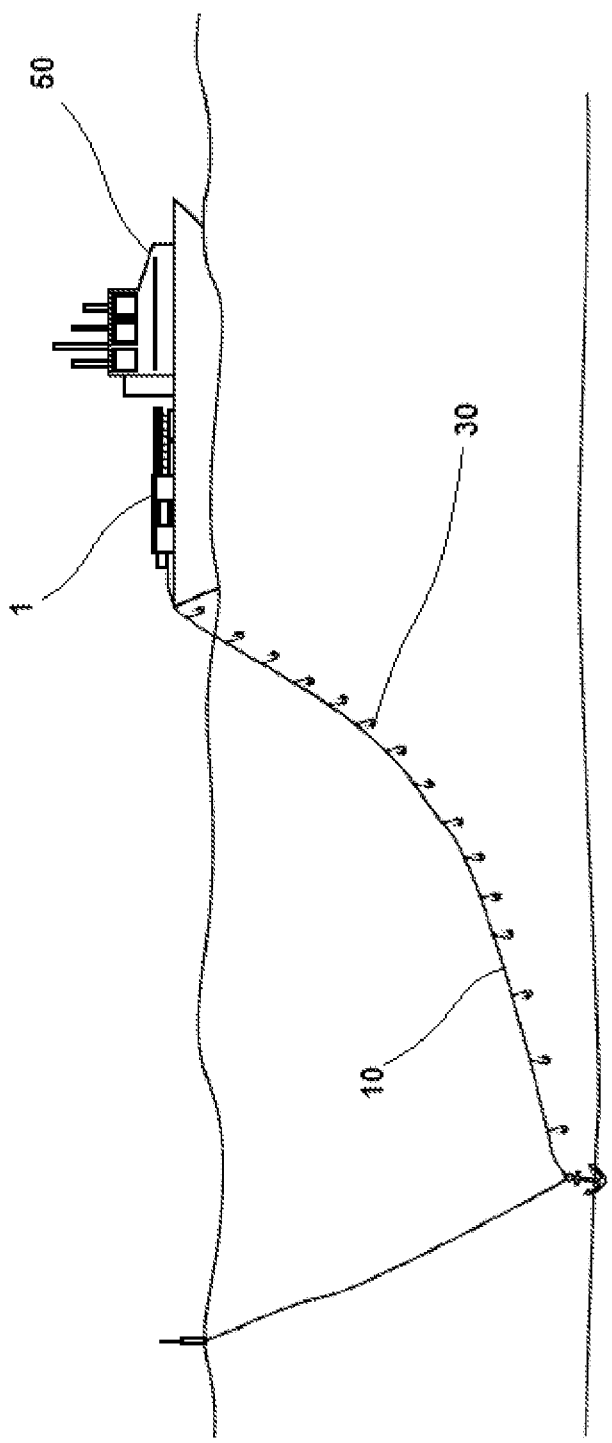
FIG. 11 is a stylized depiction of a fishing vessel deploying a ground line having hooks baited by the apparatus of the present invention.

The present invention discloses an apparatus 1 for automatically preparing bait 40 and engaging said prepared bait 40 onto hooks 30 associated with long line fishing gear. See FIGS. 1A and 1B. The apparatus 1 is designed for use on the deck of a fishing vessel 50. See FIG. 11. The apparatus 1 comprises a baiter housing 100 with a removably attached magazine 200. The baiter housing 100 further comprises a hook rail extension 300, a hook orienting means 400, a baiting area 500, a bait cutting means 600, and a bait moving means 700 for moving bait 40 to the baiting area 500. In the preferred embodiment the baiter housing 100 further comprises a second hook rail extension 350, a second hook orientation means, a second baiting area, a second bait cutting means, and a second bait moving means, and there is a second magazine 250 removably attachable to the baiter housing 100. In this embodiment the additional components are configured substantially identically to the originally described components, and are located alongside and substantially parallel to the originally described components. This embodiment will be referred to as a double-sided configuration.

The magazine 200 is substantially linear and substantially rigid, with an upwardly oriented hook rail 210 formed onto its top edge 212. See FIG. 2A. The hook rail 210 is suitably dimensioned to allow the curved part 32 of a hook 30 to fit over the hook rail 210, with the barb 36 of the hook 30 oriented downward against the inside surface of the hook rail 210 and the shaft 34 of the hook 30 oriented downward against the outside surface of the hook rail 210. The gangion 20 depends downward from the end of the shaft 34 of the hook 30 to a ground line 10 located in a tub 110 placed under the magazine 200. The magazine 200 may further comprise a hook rail cap 214. The hook rail cap 214 is substantially linear and located above and spaced apart from the hook rail 210 of the magazine 200, forming a gap between the hook rail 210 and the hook rail cap 214. See FIG. 2A. The gap is slightly greater than the thickness of a hook 30 such that the barbed end 36 of a hook 30 can be inserted into the gap and placed onto the hook rail 210 of the magazine 200. Use of the hook rail cap 214 minimizes the chance of hooks 30 falling off the hook rail 210 as they slide along and off the magazine 200. The magazine 200 may be constructed of any appropriate material, such as stainless steel, Teflon®, high impact plastic, aluminum, and the like.

Hooks 30 placed onto the hook rail 210 of the magazine 200 slide along the hook rail 210 towards and off the proximate end 220 of the magazine 200 and onto the hook rail extension 300. Because the magazine 200 is removable from the apparatus 1, a length of ground line 10 maybe prepared by coiling the ground line 10 into a tub 110 and placing the associated hooks 30 onto the magazine 200. A removable cover 240 may be placed onto the magazine 200 to hold the hooks 30 in place thereon. See FIGS. 2B and 2C. The cover 240 may have flanges to allow it to snap onto the magazine 200. It may be attached to the magazine 200 by mechanical fasteners or by elastomeric cords. In one embodiment the inside of the cover 240 is lined with an elastomeric material, to better retain the hooks 30 in the magazine 200. In the preferred embodiment the cover 240 is constructed of stainless steel, though other materials may also be used, such as a high impact plastic, aluminum, and the like. So configured, multiple lengths of ground line 10 can be prepared in advance of use, each placed in a tub 110 and having its own associated magazine 200. As ground line 10 is deployed into the ocean, a new length of ground line 10 is readied for use by swapping out the spent tub 110 and magazine 200 and replacing it with a new tub and magazine containing hooks 30.

The magazine 200 is removably attached by its proximate end 220 to the hook rail extension 300, which extends rearward from the baiter housing 100. The attachment means may be any mechanical configuration suitable for the purpose. In the preferred embodiment, the proximate end 220 of the magazine 200 comprises a plurality of apertures, and the hook rail extension's 300 distal end comprises a complementary plurality of pegs extending therefrom, configured to be insertable into the apertures formed into the proximate end 220 of the magazine 200. This allows for a secure fit as well as easy removal and reattachment of the magazine 200 onto the hook rail extension 300.

Figure 4:
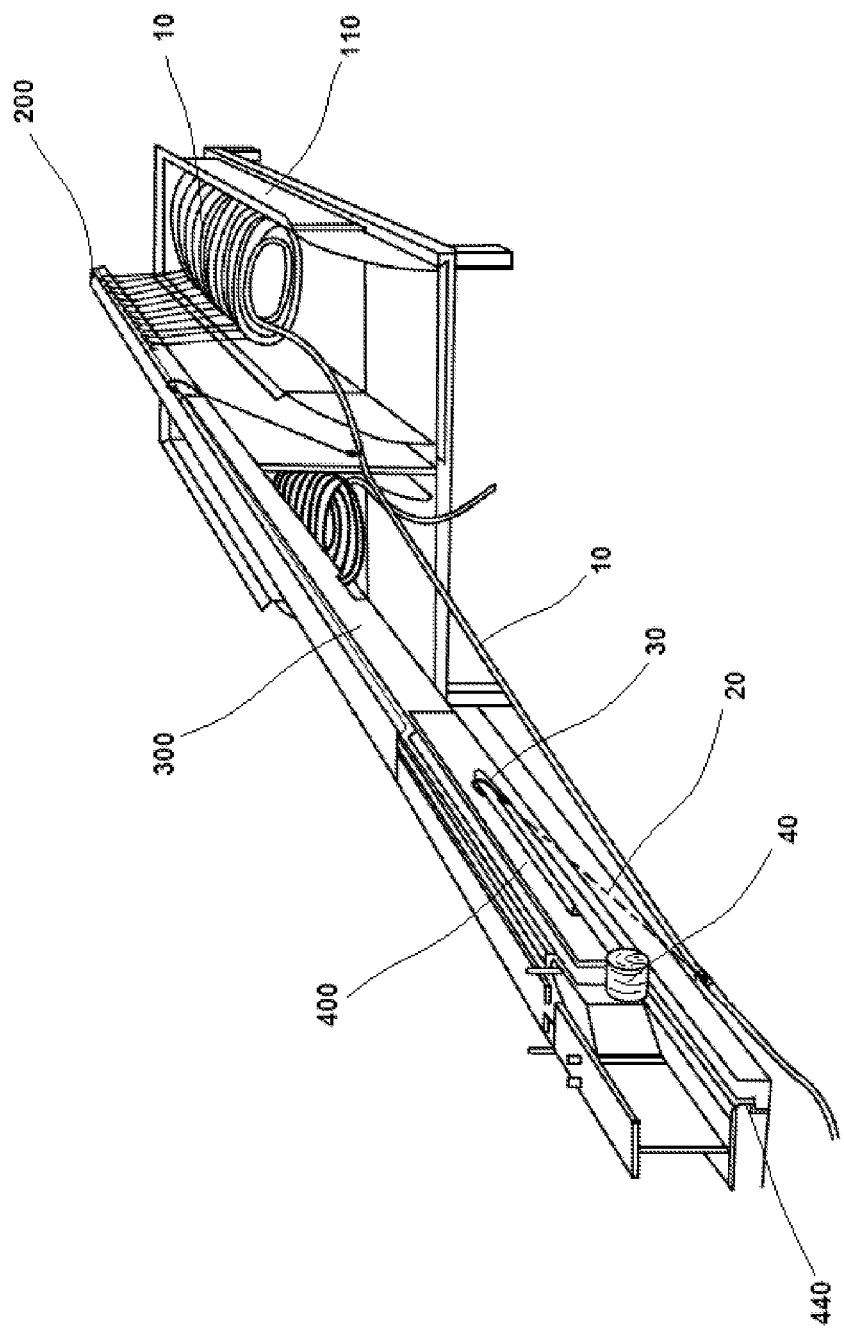
FIG. 4 is a perspective partial view of the apparatus, showing the magazine, hook rail extension, hook orienting means, and baiting area (not shown are the bait feeding means or cutting means).

The hook rail extension 300 is substantially linear and substantially rigid, see FIG. 4, with an upwardly oriented hook rail 310 formed onto its top edge 312. The hook rail extension 300 extends rearward from the baiter housing 100, with its distal end suitably adapted to engage the proximate end 220 of a magazine 200, as described above. In the preferred embodiment, the end of the baiter housing 100 comprises a plurality of apertures, and the hook rail extension's 300 proximate end 320 comprises a complementary plurality of pegs extending therefrom, configured to be insertable into the apertures formed into the end of the baiter housing 100. This allows for a secure fit of the hook rail extension 300 onto the baiter housing 100. The hook rail 310 of the hook rail extension 300 is dimensioned substantially identically to the hook rail 210 of the magazine 200, allowing a hook 30 to be placed thereon in substantially the same manner as it is placed onto the hook rail 210 of the magazine 200. The hook rail extension 300 may further comprise a hook rail cap, which is dimensioned substantially identically to the hook rail cap 214 of the magazine 200. The hook rail extension 300 may further comprise a plurality of brushes 330,380 located within the gap between the hook rail 310 and the hook rail cap. Such brushes 330,380 assist in orienting the hooks 30 as they are slid along and off the hook rail 310 of the hook rail extension 300. The hook rail 310 of the hook rail extension 300 is aligned with the hook rail 210 of the magazine 200 when the magazine 200 is attached to the hook rail extension 300, such that hooks 30 slide from the magazine 200 to the hook rail extension 300. Hooks 30 then continue to slide along the hook rail 310 of the hook rail extension 300 towards and off the proximate end 320 of the hook rail extension 300 and into the hook orienting means 400. The hook rail extension 300 may be constructed of any appropriate material, such as stainless steel, Teflon®, high impact plastic, and the like. In the preferred embodiment the hook rail extension 300 is constructed of aluminum.

Figure 3:
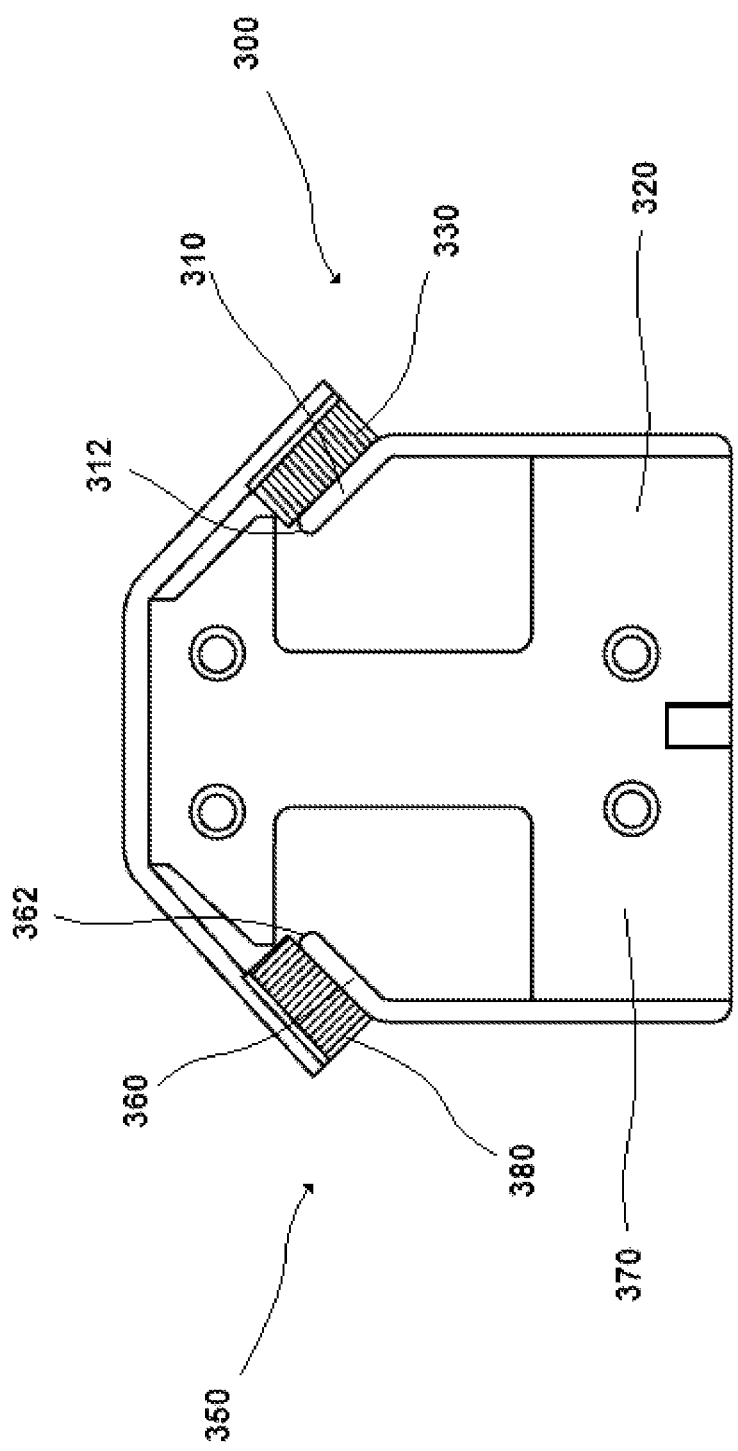
FIG. 3 is a front plan view of the hook rail extension, double sided.

In double sided embodiments of the present invention, a second hook rail extension 350 is configured substantially identically to the hook rail extension 300, as described above, having an upwardly oriented hook rail 360 formed onto its top edge 362. The second hook rail extension 350 extends rearward from the baiter housing 100 and is attached thereto by its proximate end 370. In the most preferred embodiment, the second hook rail extension 350 is located lateral to the hook rail extension 300 and integrated therewith in a single unit. See FIG. 3. A magazine 200 can be attached to the hook rail extension 300 while a second magazine 250 can be simultaneously attached to the second hook rail extension 350. The leading end of the ground line 10 associated with the second magazine 250 can be attached to the terminal end of the ground line 10 associated with the magazine 200; as that ground line 10 is completely deployed the second length of ground line 10 will immediately begin deploying. Then the first magazine 200 can be swapped out for another magazine with yet another length of ground line 10, and the process repeats on the second side of the apparatus 1.

Figure 5:
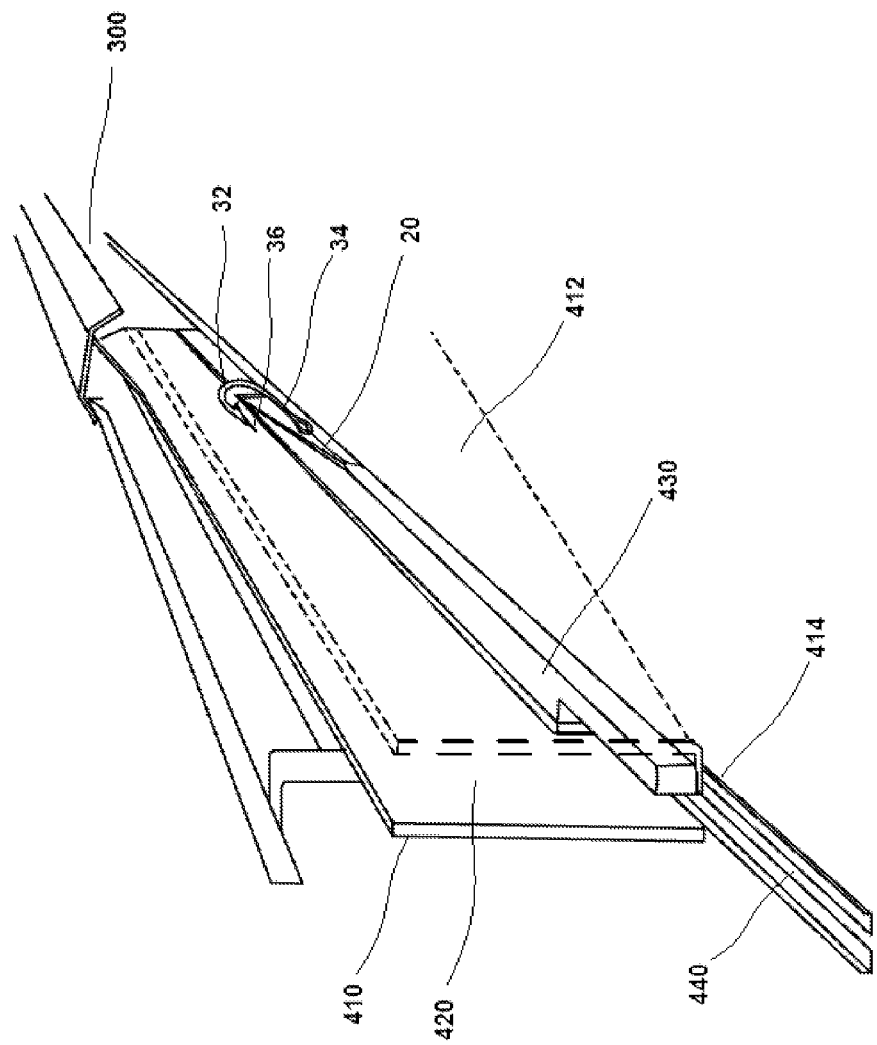
FIG. 5 is a perspective partial view of the hook orienting means of the apparatus (with the outer panel shown in ghost line).

The hook orienting means 400 is adapted to orient the hook 30 properly such that its barb 36 is directed forward in order to engage a piece of bait 40. The hook orienting means 400 comprises a first hook orienting panel 410, a second hook orienting panel 412, a base panel 414, a hook orienting slot 420, a hook laydown bar 430, and a gangion slot 440. See FIG. 5. The first hook orienting panel 410 is substantially planar and oriented substantially vertically and substantially parallel to the direction of travel of the hook 30 as the hook 30 is drawn through the apparatus 1. The second hook orienting panel 412 is configured substantially identically to the first hook orienting panel 410 and is oriented substantially vertically and substantially parallel to and spaced apart from the first hook orienting panel 410. The base panel 414 is substantially planar and located below the first and second hook orienting panels 410,412. It is oriented substantially horizontally and substantially perpendicular to the first and second hook orienting panels 410,412. The hook orienting slot 420 is formed in the space between the first and second hook orienting panels 410,412 and above the base panel 414. The first and second hook orienting panels 410,412 and the base panel 414 are constructed of any suitable material, such as stainless steel or aluminum. In the preferred embodiment the ends of the first and second hook orienting panels 410,412 closest to the hook rail extension 300 are slightly flared, to present a larger opening for hooks 30 sliding off the hook rail extension 300 and into the hook orienting slot 420.

Figure 6:
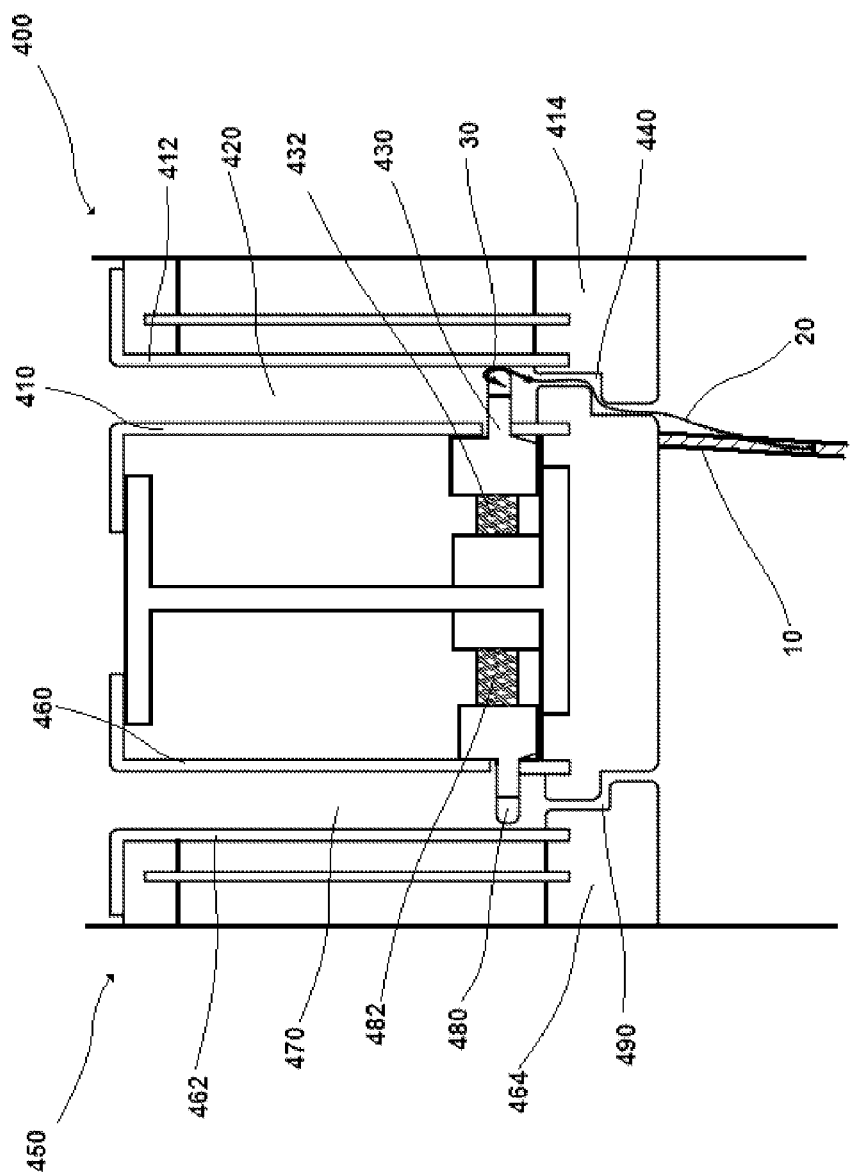
FIG. 6 is a front plan view of the hook orienting means, double sided.

The hook orienting slot 420 receives the hook 30 from the proximate end 320 of the hook rail extension 300. Before the hook 30 has slid off the hook rail extension 300 the gangion 20 has already entered a gangion slot 440 formed into and through the base panel 414, running the entire length of the base panel 414. As it slides off the hook rail extension 300 the hook 30 enters the hook orienting slot 420 shaft 34 first. The gangion slot 440 is oriented substantially parallel to the direction of travel of the hook 30 as the hook 30 is drawn through the apparatus 1. See FIG. 6. This configuration allows the hook 30 to remain above the base panel 414 while the ground line 10 is located below the base panel 414, with a portion of the gangion 20 being located above the base panel 414, another portion of the gangion 20 being located within the gangion slot 440, and the remaining portion of the gangion 20 being located below the base panel 414. In the preferred embodiment the gangion slot 440 is angled laterally, to allow for the gangion 20 to pass through the base panel 414 while preventing the shaft 34 of the hook 30 from passing through the base panel 414. See FIG. 6.

To keep the hook 30 from rotating out of its proper orientation while it travels through the hook orienting slot 420, the hook orienting means 400 comprises a hook laydown bar 430. See FIG. 5. The hook laydown bar 430 is substantially planar and elongate and located within the hook orienting slot 420, above and spaced apart from the base panel 414. It is further adjacent to the first hook orienting panel 410 and spaced apart from the second hook orienting panel 412. So oriented, the hook laydown bar 430 creates a side gap between it and the second hook orienting panel 412 and a lower gap between it and the base panel 414. These gaps are each just slightly wider than the thickness of a hook 30. See FIG. 6. The shaft 34 of the hook 30 slides along within the lower gap, while the curved portion 32 of the hook 30 slides along within the side gap. The force pulling the gangion 20 draws the end of the shaft 34 of the hook 30 forward and downward, preventing the shaft 34 from lifting out of the lower gap, and the side gap prevents the curved end 32 of the hook 30 from rotating. In the preferred embodiment the hook laydown bar 430 is laterally movable within the hook orienting slot 420, and biased towards the second hook orienting panel 412 by a spring 432. A force acting on the hook laydown bar 430 moves the hook laydown bar 430 away from the second hook orienting panel 412 and the removal of said force from the hook laydown bar 430 allows the spring 432 to move the hook laydown bar 430 towards the second hook orienting panel 412. This prevents binding if multiple hooks 30 should enter the hook orienting slot 420 at the same time.

In double sided embodiments of the present invention, a second hook orienting means 450 is configured substantially identically to the hook orienting means 400, the second hook orienting means 450 having a first hook orienting panel 460, a second hook orienting panel 462, a base panel 464, a hook orienting slot 470, a hook laydown bar 480, a laydown bar biasing spring 482, and a gangion slot 490 configured as described above. In the preferred embodiment, the second hook orienting means 450 is located lateral to and substantially parallel with the hook orienting means 400. See FIG. 6.

Figure 8:
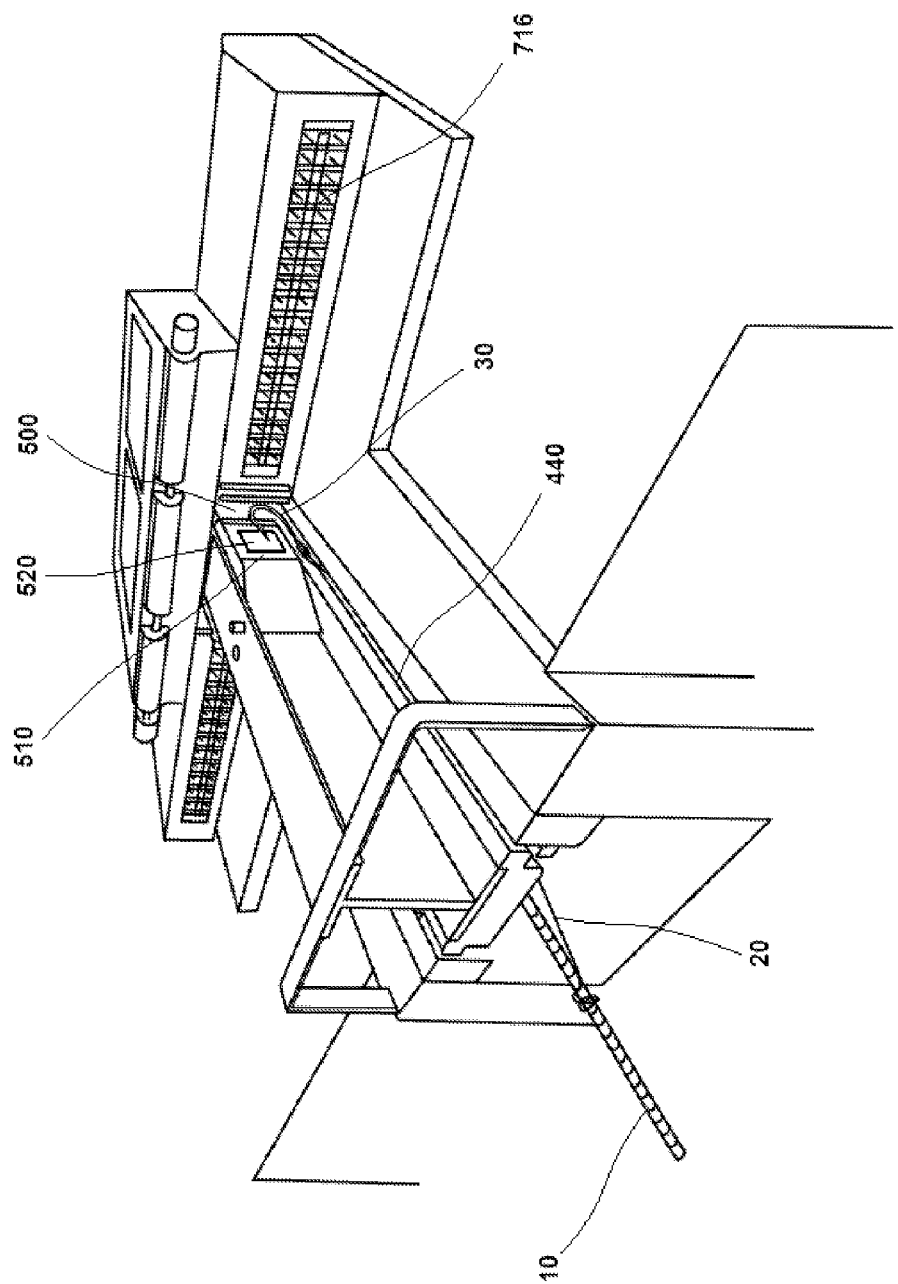
FIG. 8 is a perspective partial view of the bait feeder means and baiting area of the apparatus.

The baiting area 500 is located in the baiter housing 100 in line with and forward of the hook orienting slot 420. See FIG. 8. The baiting area 500 is substantially open on three sides and bounded by a side wall 510 on a fourth side. The side wall 510 is oriented substantially parallel with the direction of travel of a hook 30 as the hook 30 moves along the hook orienting slot 420. The base panel 414 of the hook orienting means 400 extends forward into the baiting area 500, forming the bottom of the baiting area 500. The gangion slot 440 continues through the baiting area 500. The side wall 510 of the baiting area 500 has a baiting area switch 520 located thereon. The baiting area switch 520 is capable of being activated by contact with a piece of bait 40.

The baiting area 500 has a bait entry point, located at the first of the substantially open sides of the baiting area 500 opposite the side wall 510 of the baiting area 500. Bait 40 enters the baiting area 500 from the bait moving means 700 through the bait entry point. The baiting area 500 has an entrance region, located at the second of the substantially open sides of the baiting area 500, between the hook orienting means 400 and the baiting area 500. A hook 30 moving along the hook orienting slot 420 enters the baiting area 500 at its entrance region. The baiting area 500 has an exit region, located at the third of the substantially open sides of the baiting area 500 opposite the entrance region. A hook 30 moving through the baiting area 500 exits the baiting area 500 at its exit region.

The baiting area 500 further comprises a spring tensioned retention bar 540. The retention bar 540 is located proximate to the exit region of the baiting area 500. It has a down position and an up position, see FIG. 9A, whereby when the retention bar 540 is in the down position it substantially blocks the exit region of the baiting area 500, preventing items located within the baiting area 500 from exiting the baiting area 500, see FIG. 9B, and when the retention bar 540 is in the up position it substantially uncovers the exit region of the baiting area 500, allowing items located within the baiting area 500 to exit the baiting area 500, see FIG. 9C. The retention bar 540 is suitably adapted to retain bait 40 placed within the baiting area 500 when the retention bar 540 is in the down position. When a sufficient force is applied to the retention bar 540 it is pivotally moved to the up position. See FIG. 9C. The retention bar 540 is moved to the down position by its spring when the force is removed from it. The tension of the spring can be adjusted, to require more or less force to move the retention bar 540. This is useful when different types of bait 40 are used. For example, fresh bait 40 requires less force for the hook 30 to penetrate it, so the retention bar spring can be set with less tension when using fresh bait 40. Frozen bait 40, however, requires more force for the hook 30 to penetrate it. If the retention bar 540 is too easily moved, the hook 30 may simply push the frozen bait 40 under and past the retention bar 540 without piercing the bait 40. By increasing the tension of the retention bar spring, the frozen bait 40 is held in place longer until a greater force is applied; this greater force allows the hook 30 to pierce the frozen bait 40.

Figure 7:
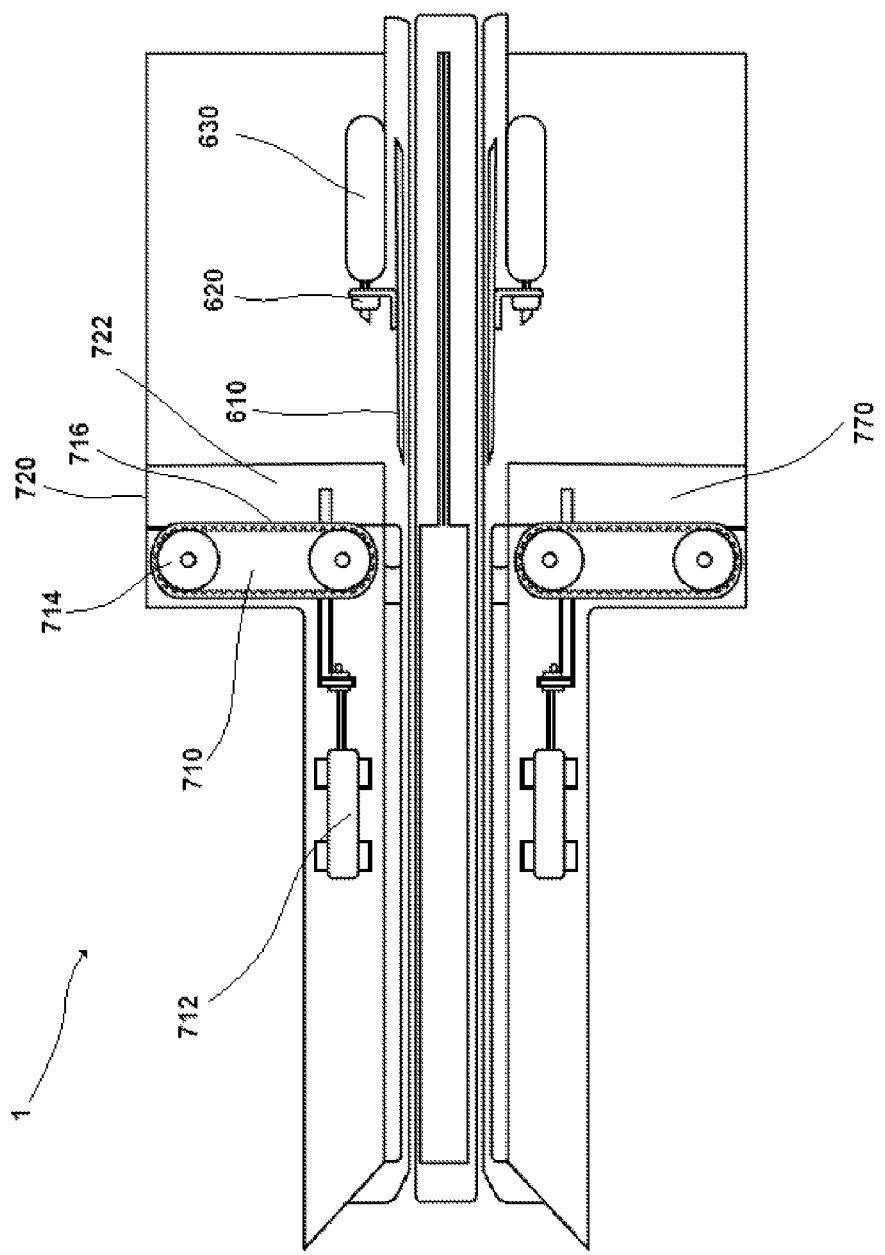
FIG. 7 is a top plan partial view of the bait feeder means and cutting means of the apparatus.
Figure 10A:
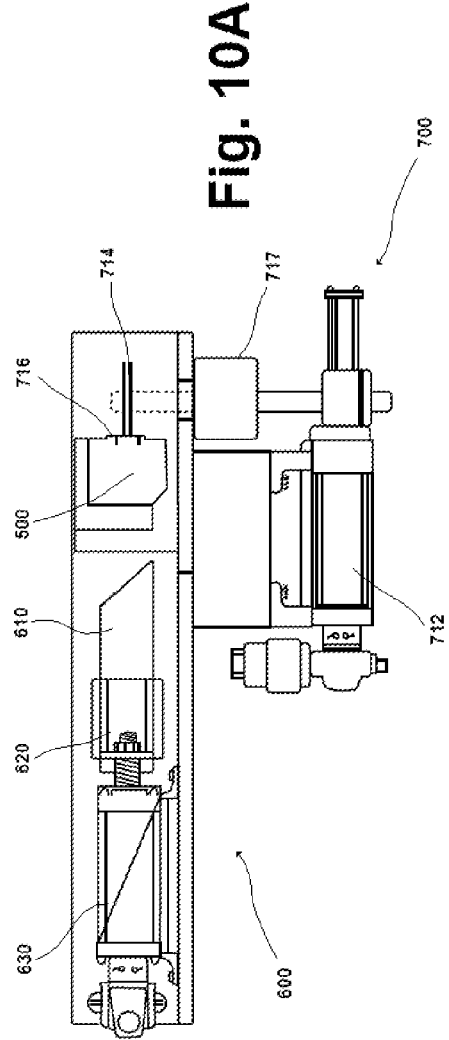
FIG. 10A is a plan side partial view of the cutting means moving mechanism and the bait feeder means moving mechanism.
Figure 10B:
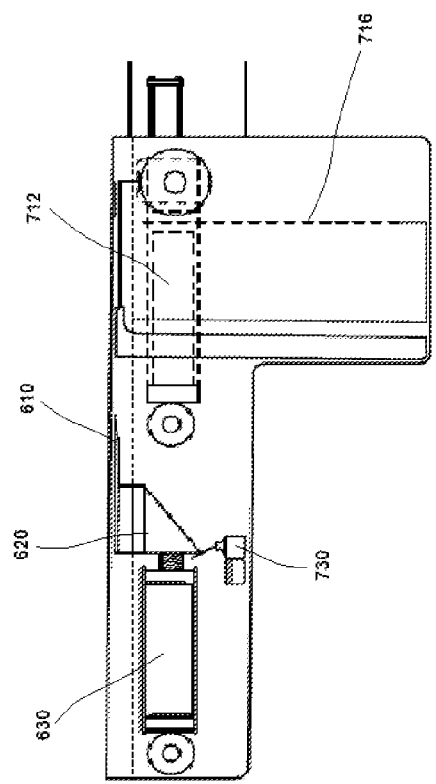
FIG. 10B is a plan top partial view of the cutting means moving mechanism and the bait feeder means moving mechanism (in ghost line)

The bait cutting means 600 comprises a cutting blade assembly 620, a cutting blade 610, and a cutting blade positioning device 630. See FIGS. 7, 10A, and 10B. The cutting blade 610 is attached to the cutting blade assembly 620. The cutting blade assembly 620 is attached to the cutting blade positioning device 630. The cutting blade assembly 620 is extendable and retractable, with the cutting blade positioning device 630 being suitably adapted to extend the cutting blade assembly 620 and to retract the cutting blade assembly 620. Extension and retraction of the cutting blade assembly 620 moves the cutting blade 610 into and out of the baiting area 500. The cutting blade 610 is suitably adapted to cut bait 40 located within the baiting area 500 when the cutting blade assembly 620 is extended. The cutting blade 610 is further suitably adapted to at least partially cover the open bait entry point of the baiting area 500 when the cutting blade assembly 620 is extended. When the cutting blade assembly 620 is retracted the cutting blade 610 at least partially uncovers the bait entry point of the baiting area 500. So configured, the cutting blade 610 laterally retains cut bait 40 within the baiting area 500 when the cutting blade assembly 620 is extended.

The cutting blade positioning device 630 is further adapted to extend the cutting blade assembly 620 when the baiting area switch 520 is activated. The cutting blade positioning device 630 retracts the cutting blade assembly 620 when the baiting area switch 520 is deactivated. As described above, an uncut piece of bait 40 entering the baiting area 500 through the baiting area entry point comes into contact with the baiting area switch 520 located on the side wall 510 of the baiting area 500, activating the baiting area switch 520. Activation of the baiting area switch 520 causes the cutting blade positioning device 630 to extend the cutting blade assembly 620, thereby moving the cutting blade 610 into the baiting area 500 and causing the cutting blade 610 to cut the bait 40 into its desired size. As long as the cut piece of bait 40 remains in the baiting area 500 the baiting area switch 520 remains activated and the cutting blade assembly 620 remains extended. Once the hook 30 pierces the cut bait 40 and draws it out of the baiting area 500, the baiting area switch 520 is deactivated, causing the cutting blade positioning device 630 to retract the cutting blade assembly 620, thereby retracting the cutting blade 610 and uncovering the baiting area entry point, allowing another piece of bait 40 to be moved into the baiting area 500, repeating the process. In one embodiment the baiting area switch 520 is a pressure plate 522 having a biasing spring, with the biasing spring adapted to bias the pressure plate 522 into the baiting area 500.

In one embodiment the cutting blade assembly 620 is further adapted to control the positioning of the retention bar 540. Retraction of the cutting blade assembly 620 results in the retention bar 540 being moved to the up position and extension of the cutting blade assembly 620 results in the retention bar 540 being moved to the down position. This feature causes the retention bar 540 to be moved out of the way when a new piece of bait 40 is moved into the baiting area 500. Movement of the retention bar 540 may be accomplished by a series of rods connecting the cutting blade assembly 620 with the retention bar 540. A pulley and cable arrangement may also be used, as well as other means, such as electronic controls and actuators as are well known in the art.

In the preferred embodiment the cutting blade positioning device 630 comprises an air motor. See FIGS. 10A and 10B. An air motor comprises a cylinder and a piston, and pneumatic means for rapidly moving the piston within the cylinder. Air pressure is directed by a valve into either the front or the rear of the cylinder; when air pressure is applied to the rear of the cylinder the piston is extended, and when air pressure is applied to the front of the cylinder the piston is retracted. Many different air motors are known in the art. An example of a preferred air motor is the Parker Hannifin Pneumatic Rotary Actuator™.

In double sided embodiments of the present invention, a second baiting area, a second retention bar, and a second bait cutting means are configured substantially identically to the baiting area 500, the retention bar 540, and the bait cutting means 600 as described above, with the same components. In the preferred embodiment, the second baiting area is located lateral to and substantially parallel with the baiting area 500, and the second bait cutting means is located lateral to and substantially parallel with the bait cutting means 600.

The bait moving means 700 comprises a bait feeder 710 and a bait feeder switch 730. See FIGS. 7, 10A, and 10B. The bait feeder 710 is located in a transport member 720, with the transport member 720 being in communication with the baiting area 500 at the bait entry point. The transport member 720 may be any suitable structure, such as a conduit 722. The bait feeder 710 is suitably adapted to move uncut bait 40 along the transport member 720 to and into the baiting area 500 through the open bait entry point of the baiting area 500. In the preferred embodiment the bait feeder 710 comprises an air motor 712, a drive wheel 714, a belt 716, and a clutch 717. See FIGS. 10A and 10B. The air motor 712 is suitably adapted to move the drive wheel 714, the drive wheel 714 is suitably adapted to move the belt 716, and the belt 716 is suitably adapted to move bait 40. The air motor 712 is coupled to the drive wheel 714 by the clutch 717, which is adapted to cause the air motor 712 to engage with and disengage from said drive wheel 714, whereby the clutch 717 causes the air motor 712 to be engaged with the drive wheel 714 during the air motor's 712 power cycle and the clutch 717 causes the air motor 712 to become disengaged from the drive wheel 714 during the air motor's 712 return cycle. This allows for the use of a reciprocating air motor 712 while keeping the bait feeder 710 moving in one direction only. In the most preferred embodiment the belt 716 is oriented vertically, so that it contacts the side of bait 40. See FIG. 7. Pins extending from the belt 716 may be used to engage the bait 40 to minimize slippage.

The bait feeder switch 730 is suitably adapted to activate and deactivate operation of the bait feeder 710. The bait feeder switch 730 is adapted to being activated and deactivated by movement of the cutting blade assembly 620. Retraction of the cutting blade assembly 620 results in the bait feeder switch 730 activating the operation of the bait feeder 710 and extension of the cutting blade assembly 620 results in the bait feeder switch 730 deactivating operation of the bait feeder 710. In one embodiment the bait feeder switch 730 is a wobble switch, with the wobble switch being in contact with the cutting blade assembly 620. See FIG. 10B. The interaction of the bait feeder switch 730 and the baiting area switch 520 allows the apparatus 1 to automatically position and prepare bait 40 as the ground line 10 is deployed. As described above, the presence of bait 40 in the baiting area 500 causes the extension of the cutting blade assembly 620. As further described above, extension of the cutting blade assembly 620 results in the bait feeder switch 730 deactivating operation of the bait feeder 710. Thus, once bait 40 is in the baiting area 500, the bait feeder 710 stops moving bait 40. Once the bait 40 leaves the baiting area 500, the cutting blade assembly 620 is retracted, and as described above the retraction of the cutting blade assembly 620 results in the bait feeder switch 730 activating the operation of the bait feeder 710. Thus, once the baiting area 500 is emptied of bait 40 the bait feeder 710 starts moving bait 40 again.

In double sided embodiments of the present invention, a second bait moving means is configured substantially identically to the bait moving means 700 as described above, with the same components. In the preferred embodiment, the second bait moving means is located lateral to the bait moving means 700. See FIGS. 7 and 8.

In one embodiment the baiter housing 100 further comprises a bait bin 120. See FIG. 1. The bait bin 120 is suitably adapted to contain a quantity of uncut bait 40. The bait bin 120 is in connection with the transport member 720, wherein the bait feeder 710 is suitably adapted to move uncut bait 40 from the bait bin 120 along the transport member 720 into the baiting area 500. In double sided embodiments of the present invention, a second bait bin is located opposite the bait bin 120 and is connection with the second transport member 770.

What has been described and illustrated herein is a preferred embodiment of the apparatus 1 of the present invention along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. An improved automatic precision baiting apparatus for use with long line fishing gear, said fishing gear comprising ground line having a plurality of gangions affixed thereto, with each said gangion having a hook attached thereto, each said hook having a substantially curved end terminating in a barb and a substantially straight end opposite the barb and a thickness, said apparatus comprising a baiter housing,
said baiter housing having a hook orientation means, a baiting area, a bait cutting means, and a bait moving means for moving bait to the baiting area; and a magazine,
said magazine being substantially linear and substantially rigid, with an upwardly oriented hook rail formed onto a top edge, a proximate end, and a distal end,
said hook rail of said magazine suitably adapted to support the curved end of a hook,
said magazine is removably attached by its proximate end to the baiter housing, and
said magazine is further suitably adapted to allow hooks supported thereon to slide along the hook rail of said magazine towards and off the proximate end such that the hook orienting means is capable of receiving hooks from the magazine;

with the hook orienting means comprising
a first hook orienting panel, a second hook orienting panel, a base panel, a hook orienting slot, a hook laydown bar, and a gangion slot,
said first hook orienting panel being substantially planar and oriented substantially vertically and substantially parallel to the direction of travel of the hook as the hook is drawn through the apparatus,
said second hook orienting panel being substantially planar and oriented substantially vertically and substantially parallel to and spaced apart from the first hook orienting panel,
said base panel being substantially planar and located below the first and second hook orienting panels and further oriented substantially horizontally and substantially perpendicular to the first and second hook orienting panels,
said hook orienting slot being a region between the first and second hook orienting panels and above the base panel,
said hook orienting slot suitably adapted to receive a hook from the magazine,
said hook laydown bar being substantially planar and located within the hook orienting slot above and spaced apart from the base panel and adjacent to the first hook orienting panel and spaced apart from the second hook orienting panel, and
said gangion slot formed into and through the base panel and oriented substantially parallel to the direction of travel of the hook as the hook is drawn through the apparatus, said gangion slot suitably adapted to accommodate a gangion as a hook is being drawn through the hook orienting slot,
with the hook laydown bar being spaced apart from the second hook orienting panel a distance slightly greater than the thickness of a hook such that the curved end of a hook is capable of passing between the hook laydown bar and the second hook orienting panel and the hook laydown bar being spaced above the base panel a distance slightly greater than the thickness of a hook such that the straight end of a hook is capable of passing between the hook laydown bar and the base panel;

with the baiting area being located in the baiter housing in line with the hook orienting slot, with the gangion slot passing through said baiting area,
said baiting area being substantially open on three sides and bounded by a side wall on a fourth side, with the side wall oriented substantially parallel with the direction of travel of a hook as the hook moves along the hook orienting slot, with the base panel of the hook orienting means extending into said baiting area and forming a bottom side of said baiting area, the side wall having a baiting area switch located thereon, said baiting area switch capable of being activated by contact with a piece of bait, said baiting area having a bait entry point, said bait entry point being located at the first of the substantially open sides of the baiting area opposite the side wall of the baiting area, said baiting area having an entrance region, said entrance region being located at the second of the substantially open sides of the baiting area, such that a hook moving along the hook orienting slot enters the baiting area at its entrance region, and said baiting area having an exit region, said exit region being located at the third of the substantially open sides of the baiting area opposite the entrance region, such that a hook moving through the baiting area exits the baiting area at its exit region;

with the bait cutting means comprising a cutting blade assembly, a cutting blade, and a cutting blade positioning device, said cutting blade being attached to said cutting blade assembly, said cutting blade assembly being attached to said cutting blade positioning device, said cutting blade assembly being extendable and retractable, said cutting blade positioning device being suitably adapted to extend the cutting blade assembly and to retract the cutting blade assembly, said cutting blade being suitably adapted to cut bait located within the baiting area when said cutting blade assembly is extended, said cutting blade being suitably adapted to at least partially cover the open bait entry point of the baiting area when said cutting blade assembly is extended and suitably adapted to at least partially uncover the bait entry point of the baiting area when said cutting blade assembly is retracted, said cutting blade being suitably adapted to laterally retain cut bait within the baiting area when said cutting blade assembly is extended, said cutting blade positioning device being further adapted to extend the cutting blade assembly when the baiting area switch is activated, and said cutting blade positioning device being further adapted to retract the cutting blade assembly when the baiting area switch is deactivated; and with the bait moving means comprising a bait feeder and a bait feeder switch, said bait feeder being located in a transport member, said transport member being in communication with the baiting area at the bait entry point, said bait feeder suitably adapted to move uncut bait along the transport member to and into the baiting area through the open bait entry point of the baiting area, said bait feeder switch suitably adapted to activate and deactivate operation of the bait feeder, and said bait feeder switch suitably adapted to being activated and deactivated by movement of the cutting blade assembly, whereby retraction of the cutting blade assembly results in the bait feeder switch activating the operation of the bait feeder and extension of the cutting blade assembly results in the bait feeder switch deactivating operation of the bait feeder.

2. The apparatus of claim 1 wherein the magazine further comprise a hook rail cap, said hook rail cap being substantially linear and located above and spaced apart from the hook rail of the magazine, forming a gap therebetween, said gap being slightly greater than the thickness of a hook such that the barbed end of a hook can be inserted into said gap and placed onto the hook rail of the magazine.

3. The apparatus of claim 1 wherein the magazine further comprises a cover, said cover suitably adapted to be removably attached to the magazine such than when attached to the magazine the cover holds in place hooks that are being supported on the hook rail of the magazine, preventing said hooks from coming off the hook rail of the magazine.

4. The apparatus of claim 1 wherein the baiter housing further comprises a hook rail extension, said hook rail extension being substantially linear and substantially rigid, with an upwardly oriented hook rail formed onto a top edge, a proximate end, and a distal end, said hook rail extension extending rearward from the baiter housing, interposed between the baiter housing and the magazine, said hook rail extension being attached by its proximate end to the baiter housing, said distal end of said hook rail extension providing an attachment point for the proximate end of the magazine, said proximate end of said hook rail extension being in line with and located proximate to the hook orienting means, and said hook rail extension further suitably adapted to allow hooks supported thereon to slide along the hook rail of said hook rail extension towards and off the proximate end such that the hook orienting means is capable of receiving hooks from the hook rail extension;

whereby the magazine is removably attached by its proximate end to said hook rail extension, said hook rail extension is suitably adapted to receive a hook from the magazine, and the hook orienting slot is suitably adapted to receive a hook from said hook rail extension.

5. The apparatus of claim 1 wherein the hook laydown bar is laterally biased towards the second hook orienting panel by a spring, such that a force acting on the hook laydown bar moves the hook laydown bar away from the second hook orienting panel and the removal of said force from the hook laydown bar allows the spring to move the hook laydown bar towards the second hook orienting panel.

6. The apparatus of claim 1 the baiting area further comprising a spring tensioned retention bar located proximate to the exit region of the baiting area, said retention bar having a down position and an up position, whereby when the retention bar is in the down position it substantially blocks the exit region of the baiting area, preventing items located within the baiting area from exiting the baiting area, and when the retention bar is in the up position it substantially uncovers the exit region of the baiting area, allowing items located within the baiting area to exit the baiting area, said retention bar being suitably adapted to retain bait placed within the baiting area when said retention bar is in the down position, said retention bar being suitably adapted to be moved to the up position when a sufficient force is applied thereto, and said retention bar is suitably adapted to be moved to the down position by its spring when said force is removed therefrom.

7. The apparatus of claim 6 wherein the cutting blade assembly is further adapted to control the positioning of the retention bar, whereby retraction of the cutting blade assembly results in the retention bar being moved to the up position and extension of the cutting blade assembly results in the retention bar being moved to the down position.

8. The apparatus of claim 1 wherein the cutting blade positioning device comprises an air motor.

9. The apparatus of claim 1 wherein the bait feeder comprises an air motor.

10. The apparatus of claim 9 wherein the bait feeder further comprises a drive wheel, a belt, and a clutch,
wherein the air motor is suitably adapted to move said drive wheel,
said drive wheel is suitably adapted to move said belt,
said belt is suitably adapted to move bait,
said air motor is coupled to said drive wheel by said clutch, and
said clutch is suitably adapted to cause said air motor to engage with and disengage from said drive wheel,
whereby said clutch causes said air motor to be engaged with said drive wheel during said air motor's power cycle and said clutch causes said air motor to become disengaged from said drive wheel during said air motor's return cycle.

11. The apparatus of claim 1 wherein the baiting area switch is a pressure plate having a biasing spring, said biasing spring adapted to bias said pressure plate into the baiting area.

12. The apparatus of claim 1 wherein the apparatus further comprise a tub, said tub being placed below the magazine and being suitably adapted to contain a length of ground line.

13. The apparatus of claim 1 wherein the baiter housing further comprises a bait bin, said bait bin suitably adapted to contain a quantity of uncut bait, said bait bin being in connection with the transport member, wherein the bait feeder is suitably adapted to move uncut bait from the bait bin along the transport member into the baiting area.

14. The apparatus of claim 1 further comprising
a second magazine,
said second magazine being substantially linear and substantially rigid, with an upwardly oriented hook rail formed onto a top edge, a proximate end, and a distal end,
said second magazine being removably attached by its proximate end to the baiter housing,
said hook rail of said second magazine suitably adapted to support the curved end of a hook,
said second magazine further suitably adapted to allow hooks supported thereon to slide along the hook rail of said second magazine towards and off the proximate end such that the second hook orienting means is capable of receiving hooks from the second magazine, and
said second magazine oriented alongside and substantially parallel to the magazine;
the second hook orienting means comprising a first hook orienting panel, a second hook orienting panel, a base panel, a hook orienting slot, a hook laydown bar, and a gangion slot,
said first hook orienting panel of the second hook orienting means being substantially planar and oriented substantially vertically and substantially parallel to the direction of travel of the hook as the hook is drawn through the apparatus,
said second hook orienting panel of the second hook orienting means being substantially planar and oriented substantially vertically and substantially parallel to and spaced apart from the first hook orienting panel of the second hook orienting means,
said base panel of the second hook orienting means being substantially planar and located below the first and second hook orienting panels of the second hook orienting means and further oriented substantially horizontally and substantially perpendicular to the first and second hook orienting panels of the second hook orienting means,
said hook orienting slot of the second hook orienting means being a region between the first and second hook orienting panels of the second hook orienting means and above the base panel of the second hook orienting means,
said hook laydown bar of the second hook orienting means being substantially planar and located within the hook orienting slot of the second hook orienting means above and spaced apart from the base panel of the second hook orienting means and adjacent to the first hook orienting panel of the second hook orienting means and spaced apart from the second hook orienting panel of the second hook orienting means, and
said gangion slot of the second hook orienting means formed into and through the base panel of the second hook orienting means and oriented substantially parallel to the direction of travel of the hook as the hook is drawn through the apparatus, said gangion slot of the second hook orienting means suitably adapted to accommodate a gangion as a hook is being drawn through the hook orienting slot of the second hook orienting means,
with the hook laydown bar of the second hook orienting means being spaced apart from the second hook orienting panel of the second hook orienting means a distance slightly greater than the thickness of a hook such that the curved end of a hook is capable of passing between the hook laydown bar of the second hook orienting means and the second hook orienting panel of the second hook orienting means and the hook laydown bar of the second hook orienting means being spaced above the base panel of the second hook orienting means a distance slightly greater than the thickness of a hook such that the straight end of a hook is capable of passing between the hook laydown bar of the second hook orienting means and the base panel of the second hook orienting means, and
said second hook orienting means oriented alongside and substantially parallel to the hook orienting means;
a second baiting area,
said second baiting area being located in the baiter housing in line with the second hook orienting slot, with the second hook orienting slot passing through said second baiting area,
said second baiting area being substantially open on three sides and bounded by a side wall on a fourth side, with the side wall of the second baiting area oriented substantially parallel with the direction of travel of a hook as the hook moves along the second hook orienting slot,
with the base panel of the second hook orienting means extending into said second baiting area and forming a bottom side of said second baiting area, the side wall of the second baiting area having a second baiting area switch located thereon, said second baiting area switch capable of being activated by contact with a piece of bait, said second baiting area having a bait entry point, said bait entry point of the second baiting area being located at the first of the substantially open sides of the second baiting area opposite the side wall of the second baiting area, said second baiting area having an entrance region, said entrance region of the second baiting area being located at the second of the substantially open sides of the second baiting area, such that a hook moving along the second hook orienting slot enters the second baiting area at its entrance region, said second baiting area having an exit region, said exit region of the second baiting area being located at the third of the substantially open sides of the second baiting area opposite the entrance region of the second baiting area, such that a hook moving through the second baiting area exits the second baiting area at its exit region, and said second baiting area oriented alongside the baiting area;

a second bait cutting means, said second bait cutting means comprising a second cutting blade assembly, a second cutting blade, and a second cutting blade positioning device, said second cutting blade being attached to said second cutting blade assembly, said second cutting blade assembly being attached to said second cutting blade positioning device, said second cutting blade assembly being extendable and retractable, said second cutting blade positioning device being suitably adapted to extend the second cutting blade assembly and to retract the second cutting blade assembly, said second cutting blade being suitably adapted to cut bait located within the second baiting area when said second cutting blade assembly is extended, said second cutting blade being suitably adapted to at least partially cover the open bait entry point of the second baiting area when said second cutting blade assembly is extended and suitably adapted to at least partially uncover the bait entry point of the second baiting area when said second cutting blade assembly is retracted, said second cutting blade being suitably adapted to laterally retain cut bait within the second baiting area when said second cutting blade assembly is extended, said second cutting blade positioning device being further adapted to extend the second cutting blade assembly when the second baiting area switch is activated, said second cutting blade positioning device being further adapted to retract the second cutting blade assembly when the second baiting area switch is deactivated, and said second bait cutting means oriented alongside the bait cutting means;

a second bait moving means, said second bait moving means comprising a second bait feeder and a second bait feeder switch, said second bait feeder being located in a second transport member, said second transport member being in communication with the second baiting area at the bait entry point of the second baiting area, said second bait feeder suitably adapted to move uncut bait along the second transport member to and into the second baiting area through the open bait entry point of the second baiting area, said second bait feeder switch suitably adapted to activate and deactivate operation of the second bait feeder, said second bait feeder switch suitably adapted to being activated and deactivated by movement of the second cutting blade assembly, whereby retraction of the second cutting blade assembly results in the second bait feeder switch activating the operation of the second bait feeder and extension of the second cutting blade assembly results in the second bait feeder switch deactivating operation of the second bait feeder, and said second bait moving means oriented across from the bait moving means.

15. The apparatus of claim 14 wherein the second magazine further comprise a hook rail cap, said hook rail cap of the second magazine being configured substantially identically as the hook rail cap of the magazine and used for the same purpose with regard to the second magazine as is the hook rail cap of the magazine with regard to the magazine.

16. The apparatus of claim 14 wherein the second magazine further comprises a cover, said cover of the second magazine being configured substantially identically as the cover of the magazine and used for the same purpose with regard to the second magazine as is the cover of the magazine with regard to the magazine.

17. The apparatus of claim 14 wherein the baiter housing further comprises a second hook rail extension, said second hook rail extension being substantially linear and substantially rigid, with an upwardly oriented hook rail formed onto a top edge, a proximate end, and a distal end, said second hook rail extension extending rearward from the baiter housing, interposed between the baiter housing and the second magazine, said second hook rail extension being attached by its proximate end to the baiter housing, said distal end of said second hook rail extension providing an attachment point for the proximate end of the second magazine, said proximate end of second said hook rail extension being in line with and located proximate to the second hook orienting means, and said second hook rail extension further suitably adapted to allow hooks supported thereon to slide along the hook rail of said second hook rail extension towards and off the proximate end such that the second hook orienting means is capable of receiving hooks from the second hook rail extension;

whereby the second magazine is removably attached by its proximate end to said second hook rail extension, said second hook rail extension is suitably adapted to receive a hook from the second magazine, the hook orienting slot of the second hook orienting means is suitably adapted to receive a hook from said second hook rail extension, and said second hook rail extension is oriented alongside and substantially parallel to the hook rail extension and integrated therewith.

18. The apparatus of claim 14 wherein the hook laydown bar of the second hook orienting means is configured substantially identically as the hook laydown bar of the hook orienting means and used for the same purpose with regard to the second hook orienting means as is the hook laydown bar of the hook orienting means with regard to the hook orienting means.

19. The apparatus of claim 14 wherein the second baiting area further comprises a spring tensioned retention bar located proximate to the exit region of the second baiting area, said retention bar of the second baiting area having a down position and an up position, whereby when the retention bar of the second baiting area is in the down position it substantially blocks the exit region of the second baiting area, preventing items located within the second baiting area from exiting the second baiting area, and when the retention bar of the second baiting area is in the up position it substantially uncovers the exit region of the second baiting area, allowing items located within the second baiting area to exit the second baiting area, said retention bar of the second baiting area being suitably adapted to retain bait placed within the second baiting area when said retention bar of the second baiting area is in the down position, said retention bar of the second baiting area being suitably adapted to be moved to the up position when a sufficient force is applied thereto, said retention bar of the second baiting area is suitably adapted to be moved to the down position by its spring when said force is removed therefrom.

20. The apparatus of claim 19 wherein the second cutting blade assembly is further adapted to control the positioning of the retention bar of the second baiting area, whereby retraction of the second cutting blade assembly results in the retention bar of the second baiting area being moved to the up position and extension of the second cutting blade assembly results in the retention bar of the second baiting area being moved to the down position.

21. The apparatus of claim 14 wherein the second cutting blade positioning device comprises an air motor.

22. The apparatus of claim 14 wherein the second bait feeder comprises an air motor.

23. The apparatus of claim 22 wherein the second bait feeder comprises a drive wheel, a belt, and a clutch, wherein the air motor of the second bait feeder is suitably adapted to move said drive wheel of the second bait feeder, said drive wheel of the second bait feeder is suitably adapted to move said belt of the second bait feeder, said belt of the second bait feeder is suitably adapted to move bait, said air motor of the second bait feeder is coupled to said drive wheel of the second bait feeder by said clutch of the second bait feeder, said clutch of the second bait feeder is suitably adapted to cause said air motor of the second bait feeder to engage with and disengage from said drive wheel of the second bait feeder, whereby said clutch of the second bait feeder causes said air motor of the second bait feeder to be engaged with said drive wheel of the second bait feeder during said air motor of the second bait feeder's power cycle and said clutch of the second bait feeder causes said air motor of the second bait feeder to become disengaged from said drive wheel of the second bait feeder during said air motor of the second bait feeder's return cycle.

24. The apparatus of claim 14 wherein the second baiting area switch is a pressure plate having a biasing spring, said biasing spring adapted to bias said pressure plate of the second baiting area switch into the second baiting area.

25. The apparatus of claim 14 wherein the apparatus further comprise a second tub, said second tub being placed below the second magazine and being suitably adapted to contain a length of ground line.

26. The apparatus of claim 14 wherein the baiter housing further comprises a second bait bin, said second bait bin suitably adapted to contain a quantity of uncut bait, said second bait bin being in connection with the second transport member, wherein the second bait feeder is suitably adapted to move uncut bait from the second bait bin along the second transport member into the second baiting area.

\* \* \* \* \*